(12) United States Patent
Horst (10) Patent No.: US 11,374,509 B2
(45) Date of Patent: Jun. 28, 2022

(54) GENERATOR PULLEY SYSTEM AND METHODS THEREOF

(71) Applicant: Honda Motor Co., Ltd., Tokyo (JP)

(72) Inventor: David Andrew Horst, Alpharetta, GA (US)

(73) Assignee: Honda Motor Co., Ltd., Tokyo (JP)

( * ) Notice: Subject to any disclaimer, the term of this patent is extended or adjusted under 35 U.S.C. 154(b) by 13 days.

(21) Appl. No.: 17/079,045

(22) Filed: Oct. 23, 2020

(65) Prior Publication Data

US 2022/0131485 A1   Apr. 28, 2022

(51) Int. Cl.
*H02P 5/74* (2006.01)
*H02J 7/00* (2006.01)
*H02P 101/25* (2016.01)

(52) U.S. Cl.
CPC .............. *H02P 5/74* (2013.01); *H02J 7/0048* (2020.01); *H02P 2101/25* (2015.01)

(58) Field of Classification Search
CPC ........ H02P 5/74; H02P 2101/25; H02J 7/0048
See application file for complete search history.

(56) References Cited

U.S. PATENT DOCUMENTS

| | | | |
|---|---|---|---|
| 7,635,037 B2 | 12/2009 | Treadwell et al. | |
| 8,123,237 B2 | 2/2012 | Takemura | |
| 9,586,797 B2 | 3/2017 | McVicar et al. | |
| 9,908,549 B2 | 3/2018 | Newell | |
| 10,486,052 B2 | 11/2019 | Choi | |
| 2004/0189477 A1* | 9/2004 | Hisano | H02J 7/32 340/573.3 |
| 2010/0270764 A1 | 10/2010 | Odle et al. | |
| 2012/0217849 A1* | 8/2012 | Aoki | B60L 15/20 310/68 D |
| 2014/0299089 A1* | 10/2014 | Koenen | F04B 17/06 123/179.28 |
| 2016/0041557 A1 | 2/2016 | Trout | |
| 2019/0291712 A1* | 9/2019 | Symanow | B60W 10/06 |
| 2020/0300206 A1* | 9/2020 | Zeiler | F02N 11/08 |

FOREIGN PATENT DOCUMENTS

| | | |
|---|---|---|
| DE | 29502567 U1 | 3/1996 |
| JP | 2005178504 A | 7/2005 |
| JP | 2005178505 A | 7/2005 |
| JP | 2005178506 A | 7/2005 |
| JP | 5041556 B2 | 10/2012 |
| JP | 5989474 B2 | 9/2016 |
| KR | 101820311 B1 | 2/2018 |
| KR | 101883646 B1 | 8/2018 |
| WO | WO2014131896 A2 | 9/2014 |
| WO | WO2019035540 A1 | 2/2019 |

* cited by examiner

*Primary Examiner* — Zoheb S Imtiaz
(74) *Attorney, Agent, or Firm* — Aaron Fong; American Honda Motor Co., Inc.

(57) ABSTRACT

The present disclosure provides a generator pulley system and methods thereof. Atop the generator pulley system may be a generator and battery for actuating at least one motor. A pull line may be retractably coupled to the front of the system. Alternatively, the pull line is not retractable. At least one sensor may be used to monitor the line. In an illustrative embodiment, the system may actuate the at least motor to steer in the direction of the pulled line. The battery may be recharged by the generator depending on its state of charge and period of time after requesting a movement of the generator.

20 Claims, 13 Drawing Sheets

GENERATOR PULLEY SYSTEM AND METHODS THEREOF

BACKGROUND

A portable generator may include an engine that converts fuel into kinetic energy and a generator that converts the kinetic energy into electricity. Portable generators may be used to provide electricity in a variety of scenarios such as backup power in emergencies, and remote power for camping or construction. Power generators may vary in weight, and when fully filled with fuel, they may be up to three hundred pounds (300 lbs.).

Power generators may incorporate a set of wheels located on one side where it may pushed or pulled on the other end. The weight, however, may still be considerable. A need therefore exists for a generator pulley system and methods thereof of that address this identified concern. Other benefits and advantages will become clear from the disclosure provided herein.

BRIEF DESCRIPTION

According to one aspect of the present disclosure, a generator pulley system is provided. The system may include a line, at least one sensor, at least one motor, a memory for storing computer readable code, and a processor operatively coupled to the memory. The processor may be configured to monitor the line with the at least one sensor and actuate the at least one motor when the line is pulled to move the system in a direction of the pulled line.

In accordance with another aspect of the present disclosure, a generator is provided. The generator may include a line, at least one sensor monitoring the line, and at least one motor for moving the generator in a direction sensed by the at least one sensor monitoring the line when pulled.

In accordance with yet another aspect of the present disclosure, a non-transitory machine-readable storage medium having instructions, which when implemented by one or more machines, cause the one or more machines to perform operations is provided. These operations may include detecting a direction of a pulled line on a generator by at least one sensor and actuating at least one motor for moving the generator in the direction detected by the at least one sensor.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

The present disclosure provides a generator pulley system and methods thereof. Atop the generator pulley system may be a generator and battery for actuating at least one motor. A pull line may be retractably coupled to the front of the system. Alternatively, the pull line is not retractable. At least one sensor may be used to monitor the line and any pulls thereon. In an illustrative embodiment, the system may actuate the at least motor to steer the generator in the direction of the pulled line. The battery may be recharged by the generator depending on its state-of-charge (SOC) and time after a movement request has been made.

Numerous other modifications or configurations to the generator pulley system and methods thereof will become apparent from the description provided below. For example, the pulley system for the generator may fit onto multiple variances of generators with the pulley system retaining its own localized battery for movement. Through this, the logic or software may be centralized to the pulley system such that it may activate the generator when the SOC is below a predetermined threshold. Advantageously, through this variance and other embodiments described herein, the generator pulley system may alleviate or eliminate the load imposed by a fully fueled generator. Terrain or other factors may be considered when rotating its motors for a much more effective design. Other advantages will become apparent from the description provided below.

Figure 1:
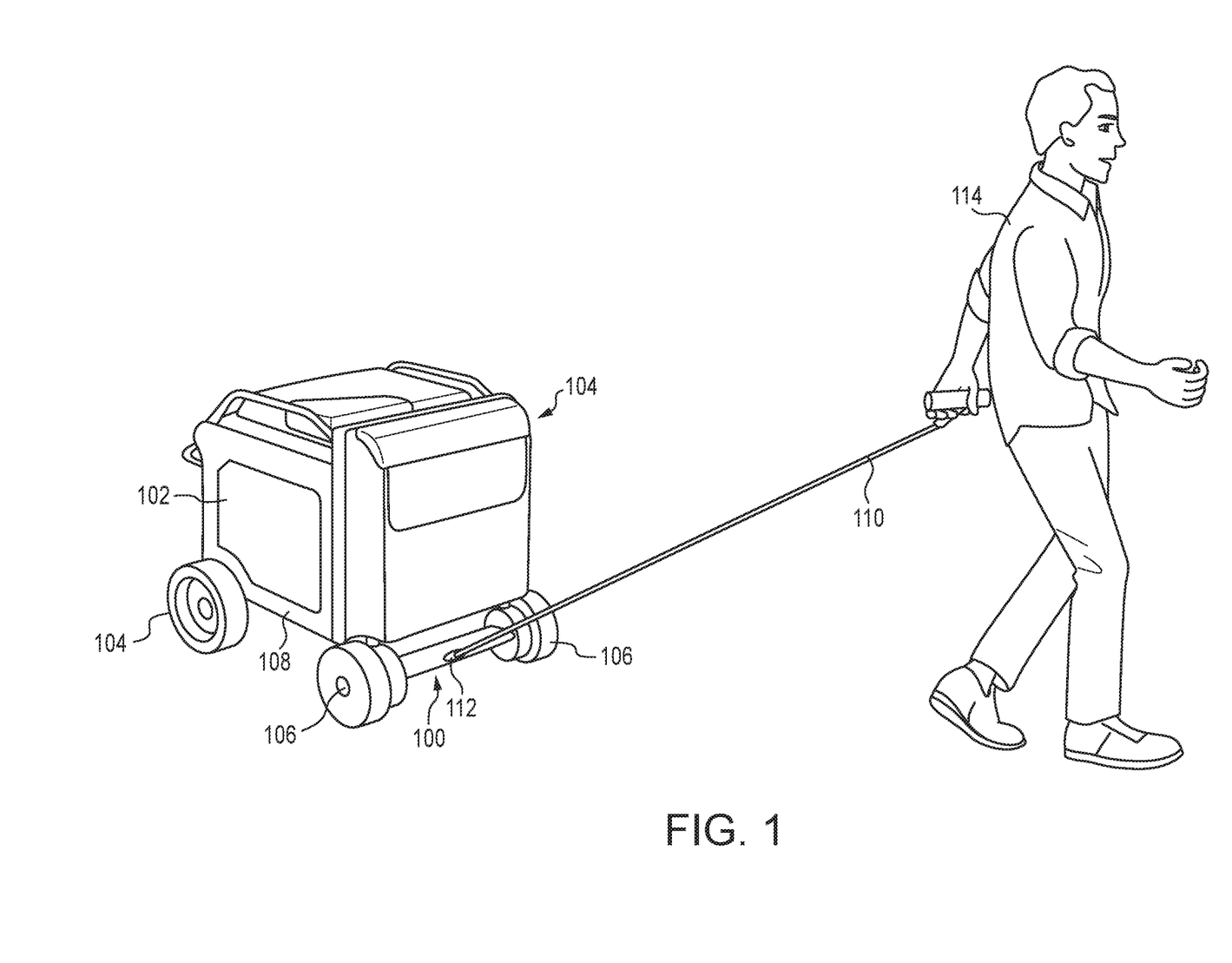
FIG. 1 is an exemplary generator pulley system in accordance with one aspect of the present disclosure.

Turning to FIG. 1, an exemplary generator pulley system 100 in accordance with one aspect of the present disclosure is provided. The system 100 may work with a number of different generators 102 and is not limited to any particular type. The generator 102 may include a fuel supply, a constant engine speed regulator, and a generator voltage regulator, cooling and exhaust systems, and lubrications systems. The generator 102 may include an automatic starting system.

The generator pulley system 100 may be a part of the generator 102 or physically separated from the generator 102. In one embodiment, a front of the generator 102 may be locked into the front wheels 106 of the system 100. This may remove the use of a frame or other components which will be discussed below. Power produced by the generator 102 may be fed into a battery of the pulley system 100, or the generator 102 may have its own battery. The battery may be used to power at least one motor which runs the generator pulley system 100.

The generator pulley system 100 may include two or more rear wheels 104 and two or more front wheels 106. Fewer or more wheels may be provided or removed. The rear wheels 104 may be made of different materials than the front wheels 106. For example, the front wheels 106 may be made of a material that may traverse slippery or rough terrain. The front wheels 106 may be made of specialized rubber. Grips may be used to climb mountainous terrain, gravel, snow, or ice.

The rear wheels 104 and front wheels 106 may be secured to a sled 108 of the generator pulley system 100. The sled 108 may be made of a rectangular or square piece of reinforced sheet metal. Other sturdy materials may be used such that it supports the generator 102. The generator 102 may be secured to the top of the sled 108 through fasteners, such as bolts or other mechanisms.

The generator pulley system 100 may include a pull line 110. The pull line 110 or line may be made of string, chain, rope, yarn, fibers, strands, metal, or the like. In one embodiment, the pull line 110 is made of a non-retractable material. The system 100 may be pulled through a pole, pillar or the like. This may be rigid. The proximal end of the pull line 110 may be held by a user 114 who wishes to have the generator 102 follow them. The distal end of the pull line 110 may be tied into the generator pulley system 100. A retractable feature may allow the pull line 110 to move in and out of the generator pulley system 100. Through this, a movement and direction of the generator pulley system 100 may be determined.

The generator 102 may be heavy, and in particular when fully fueled, the generator 102 may weight around three hundred pounds (300 lbs.). In operation, the generator pulley system 100 may be pulled through the pull line 110 to maneuver or manipulate the generator 102 to move to a location, switch its orientation, or both. The pull line 110 may be monitored by at least one sensor. When not pulled, the generator pulley system 100 may be locked into place. Either the rear wheels 104, front wheels 106 or both may be locked.

In one embodiment, a brake may also be applied when no pull on the pull line 110 is sensed. Alternatively, the generator pulley system 100 may move the generator 102 in the direction in which the pull line 110 is directed to. The pull line 110 may go through an inlet 112 which houses a pulley system.

Figure 2:
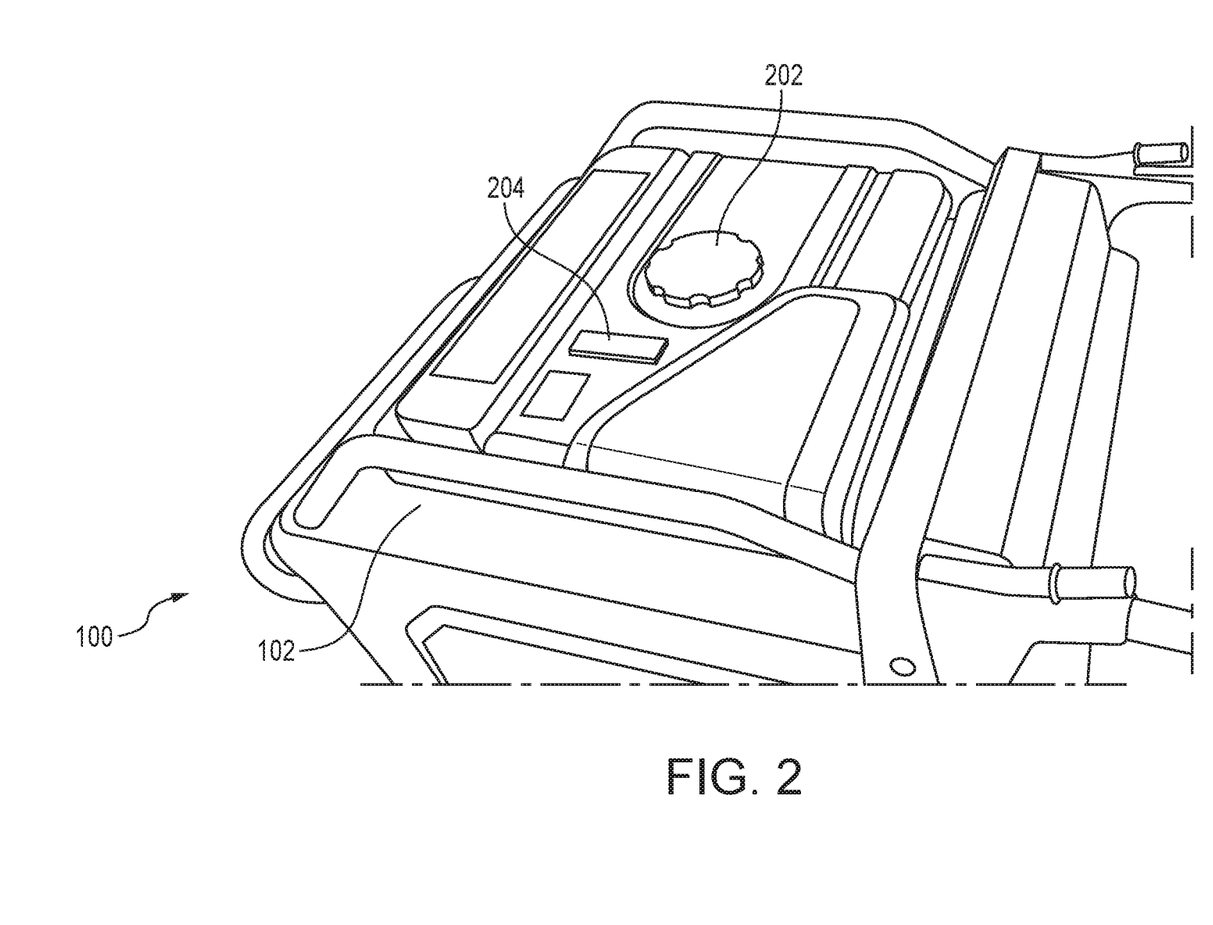
FIG. 2 is a top perspective view of the exemplary generator pulley system in accordance with one aspect of the present disclosure.

FIG. 2 is a top perspective view of the exemplary generator pulley system 100 in accordance with one aspect of the present disclosure. Specifically, a top portion of the generator 102 is shown. Fuel for running the generator 102 may be inserted into a fuel intake 202. A fuel level monitor 204 may show how much fuel is left within the generator 102. It should be noted that the generator 102 may run on other types of fuels, for example, gasoline, natural gas, liquid propane, or hydrogen.

Figure 3:
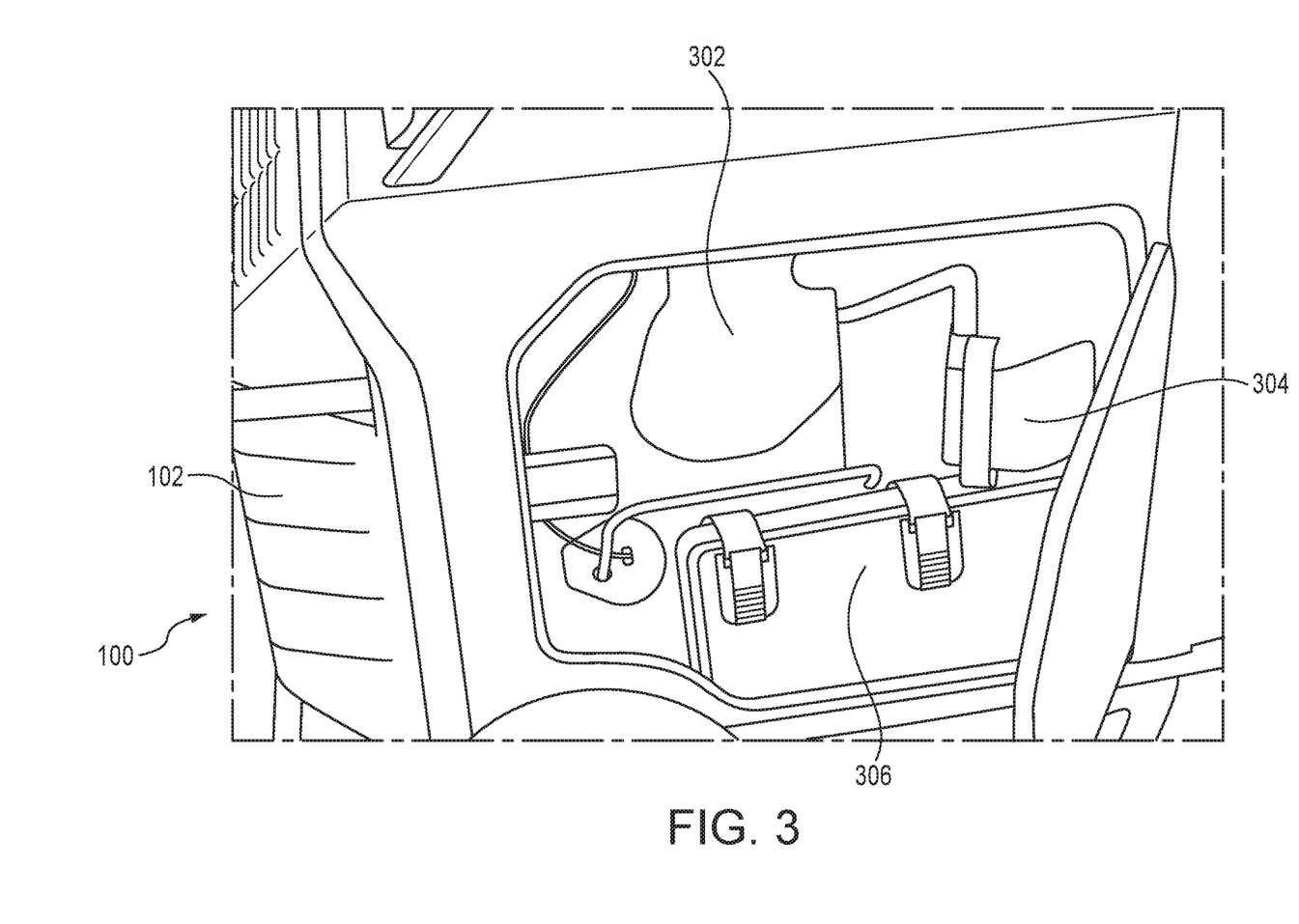
FIG. 3 is a side perspective view of the exemplary generator pulley system showing components therein in accordance with one aspect of the present disclosure.

FIG. 3 is a side perspective view of the exemplary generator pulley system 100 showing components therein in accordance with one aspect of the present disclosure. A spark plug access 302 and oil container 304 is shown within the generator 102. The spark plug access 302 may allow a user to change spark plugs within the generator 102. The spark plugs may be used for delivering electric current from an ignition system to the combustion chamber to ignite a compressed fuel/air mixture by an electric spark, while containing combustion pressure within the generator 102. The oil container 304 may include an inlet for allowing oil to be taken in. Through the oil, the generator 102 may be well lubricated. An air filter 306 may also be placed on this side of the generator 102. Latches may allow for an easy replacement of the air filter 306.

Figure 4:
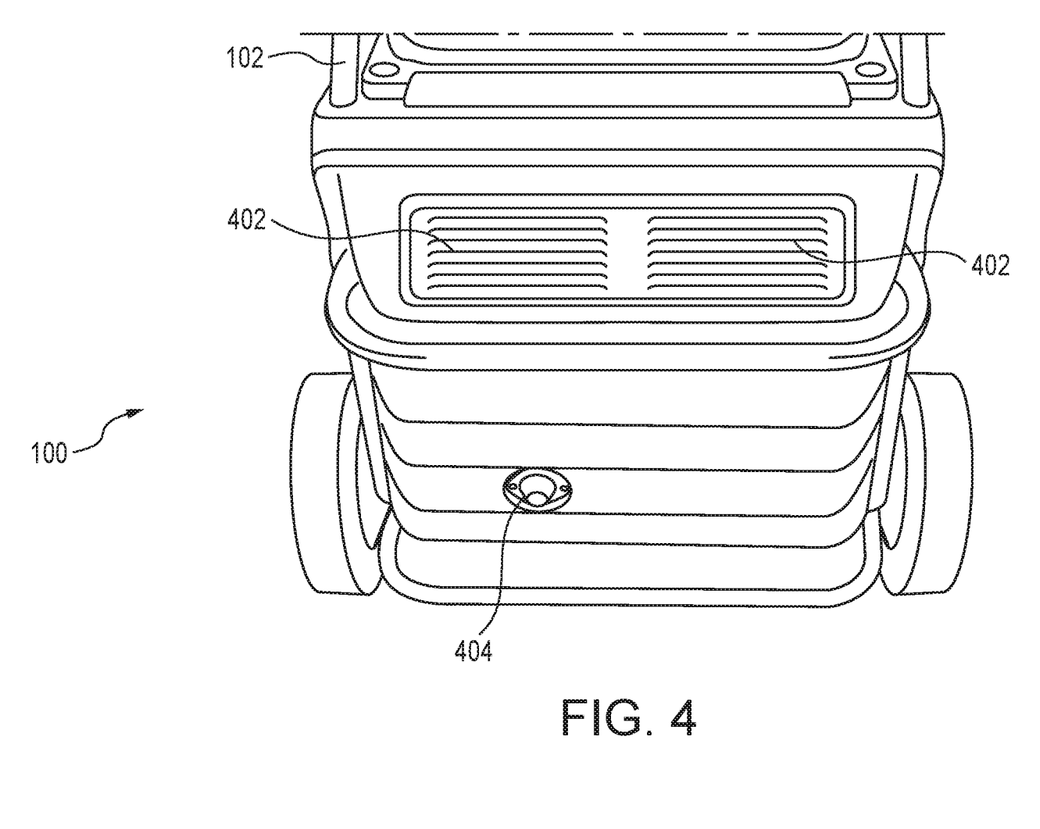
FIG. 4 is a back perspective view of the exemplary generator pulley system in accordance with one aspect of the present disclosure.

FIG. 4 is a back perspective view of the exemplary generator pulley system 100 in accordance with one aspect of the present disclosure. At least one air vent 402 may be provided on the back of the generator 102. The air vents 402 may be used to protect the internal components of the generator 102 as well as to take in air from the outside. An exhaust 404 may also be provided on the back side of the generator 102. The exhaust 404 may expel the gas released from generating energy.

Figure 5:
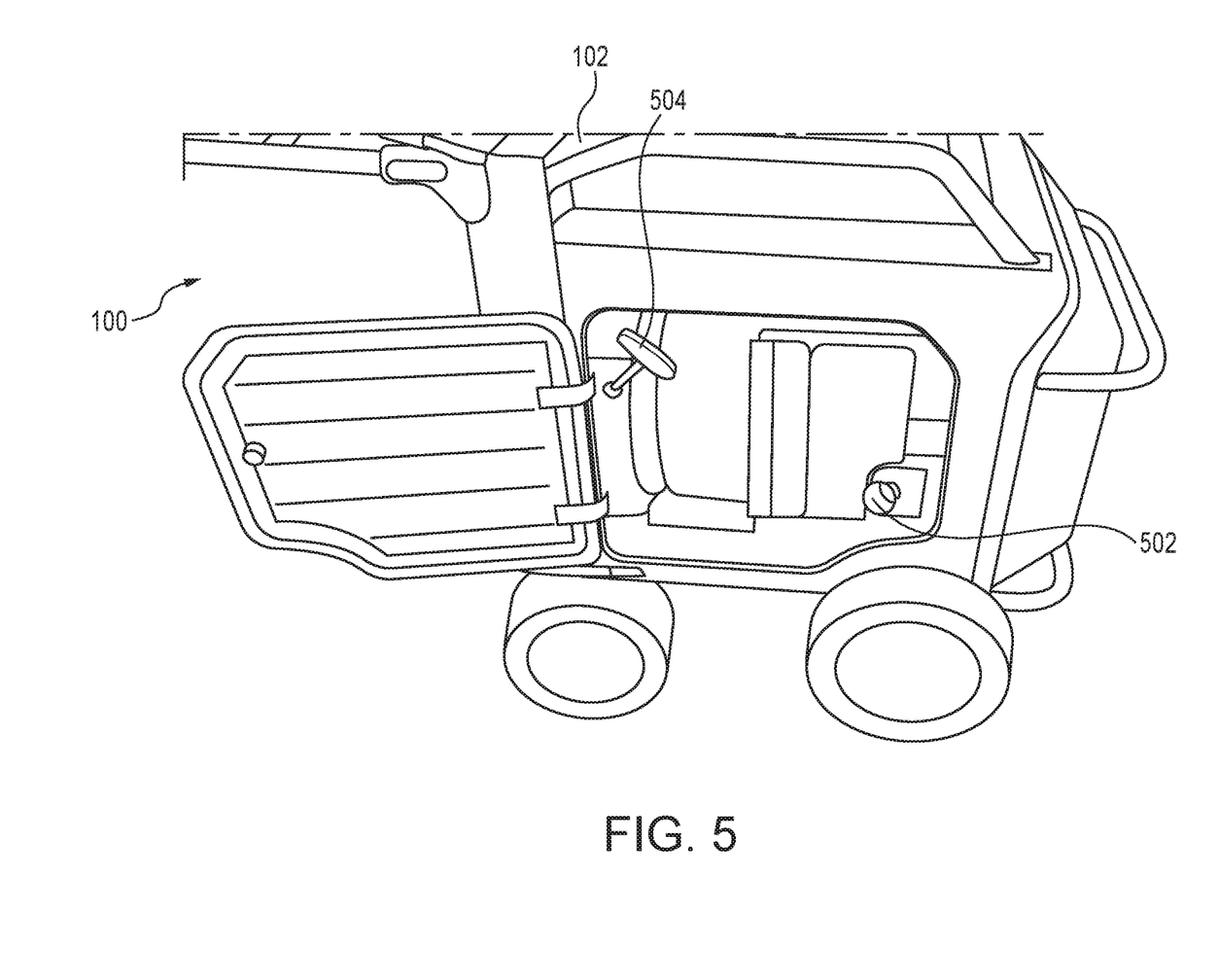
FIG. 5 is a different side perspective view of the exemplary generator pulley system in accordance with one aspect of the present disclosure.

FIG. 5 is a different side perspective view of the exemplary generator pulley system 100 in accordance with one aspect of the present disclosure. A similar panel may be opened to access components internal to the generator 102. An oil check 502 may be provided on this side. The oil check 502 may be in the form of a dip stick.

Within this side of the generator 102 may be a manual pull start 504. Typically, the generator 102 may be started through the press of a button which ignites the spark plugs. The manual pull start 504 may be used instead. A retractable string would be allowed to start the generator 102.

Figure 6:
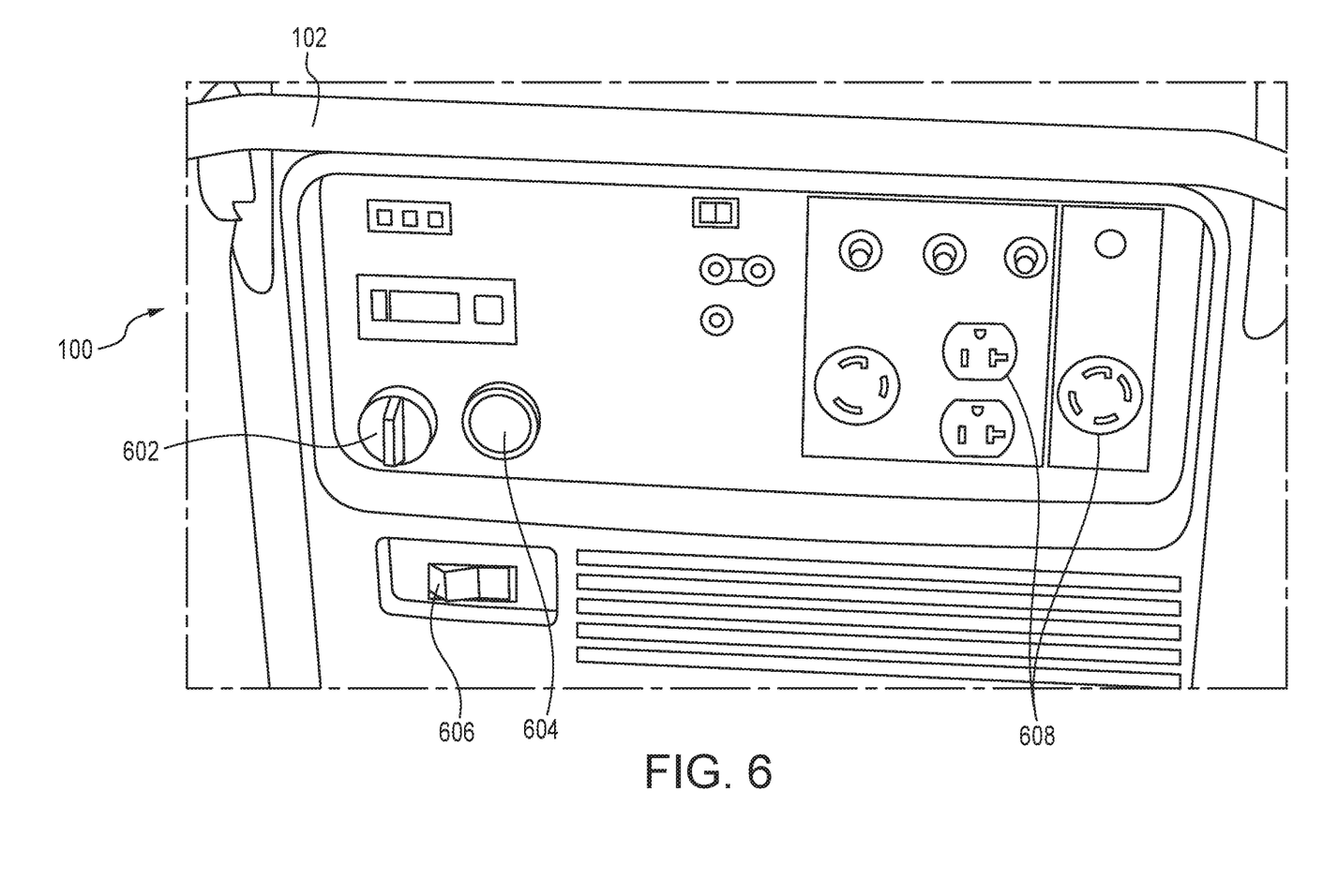
FIG. 6 is a front view of the exemplary generator pulley system in accordance with one aspect of the present disclosure.

Referring to FIG. 6, a front view of the exemplary generator pulley system 100 in accordance with one aspect of the present disclosure is provided. A panel may be provided that shows a number of options for the generator 102. A main switch 602 may be provided on the generator 102. A key may be inserted and rotated within the switch 602 to allow the generator 102 to start generating energy. An engine start 604, next to the main switch 602, may be actuated when the key has been rotated.

A switch 606 may be provided which allows varying voltages to be produced by the generator 102. As an example, 120V or 240V may be selected. 120V may be selected when less voltage is needed, which is dependent on what is plugged in. Larger voltages may be produced by the generator 102 for devices such as pumps, tools at construction sites, spotlights, or the like.

The panel may provide electrical outlets 608. As an example, prongs for inserting electrical devices that take power may be plugged into the outlets 608. The shape and size of the prongs may vary based on plug standards in use in various countries and regions. The power sockets of portable generators may generally conform to the plug standards used for building electric sockets. The prongs may provide mechanical resistance against separation of the electrical device from the portable generator.

In one embodiment, the panel may include information regarding whether the brakes of the system 100 have been locked. A clear indicator, such as in a digital display, may show this type of information. Other types of information provided within the panel may relate to the pull line. The tension in the pull line may be shown. Indicators displaying an associated speed or acceleration with the pull line may be depicted in a bar graph, for example. A sensor within the pull line may communicate information up to the panel for display. Audio information may also be provided on the amount of tension given.

In one embodiment, the system 100 may work with an application on a smartphone. Through Bluetooth®, or some other wireless communication protocol, the system 100 may receive information on where to move. The wheels on the system 100 may be controlled remotely. Typically, as will be seen below, sensors may monitor the pull of the line. In the smartphone application, these sensors may be overridden through that the application. In one example, the system 100 may use a follow me setup. The system 100 may monitor the direction and location of the smartphone, through Bluetooth®, or other wireless protocol. From there, the system 100 would actuate its motors and wheels to follow the particular smartphone.

Figure 7:
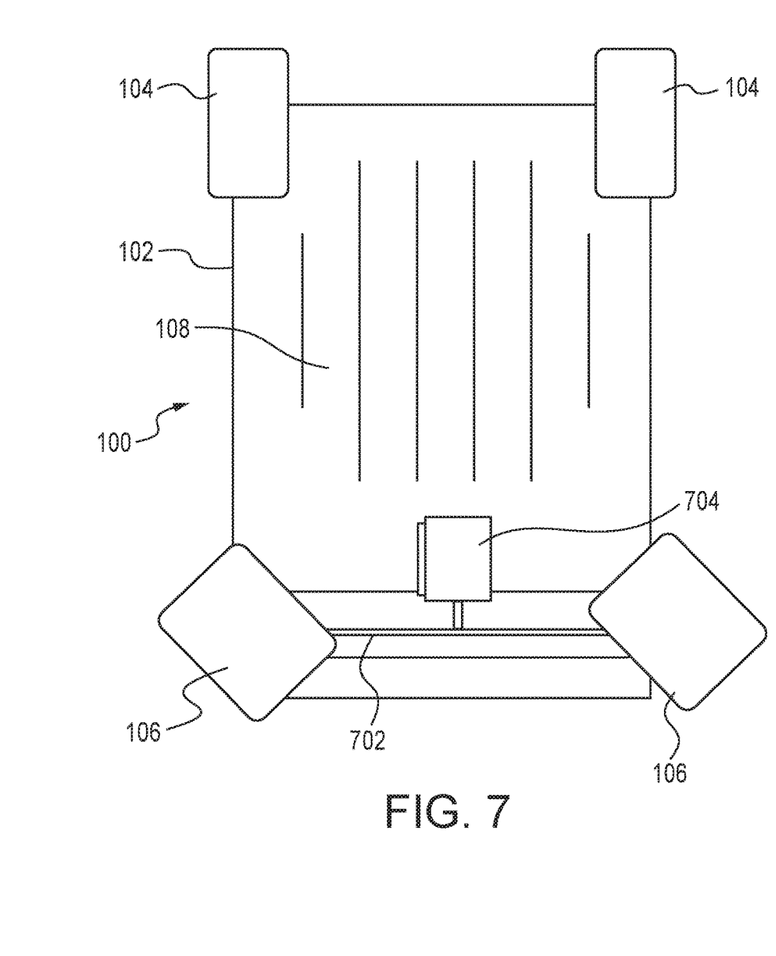
FIG. 7 is a bottom view of the exemplary generator pulley system in accordance with one aspect of the present disclosure.

FIG. 7 is a bottom view of the exemplary generator pulley system 100 in accordance with one aspect of the present disclosure. A turn shaft may run from at least one motor 704 towards the front wheels 106. The turn shaft may send power to the axle 702 which may cause the front wheels 106 to turn moving the generator pulley system 100 with the generator 102 forward. In one example, the rear wheels 104 may not rotate while the front wheels 106 may.

At least one motor 704 may drive the axle 702. The motor 704 may be powered wholly by least one battery of the generator pulley system 100, generator 102 or combination thereof. The sled 108 may envelope or cover the motor 704 such that it does not get damaged while the generator pulley system 100 is moved.

Figure 8:
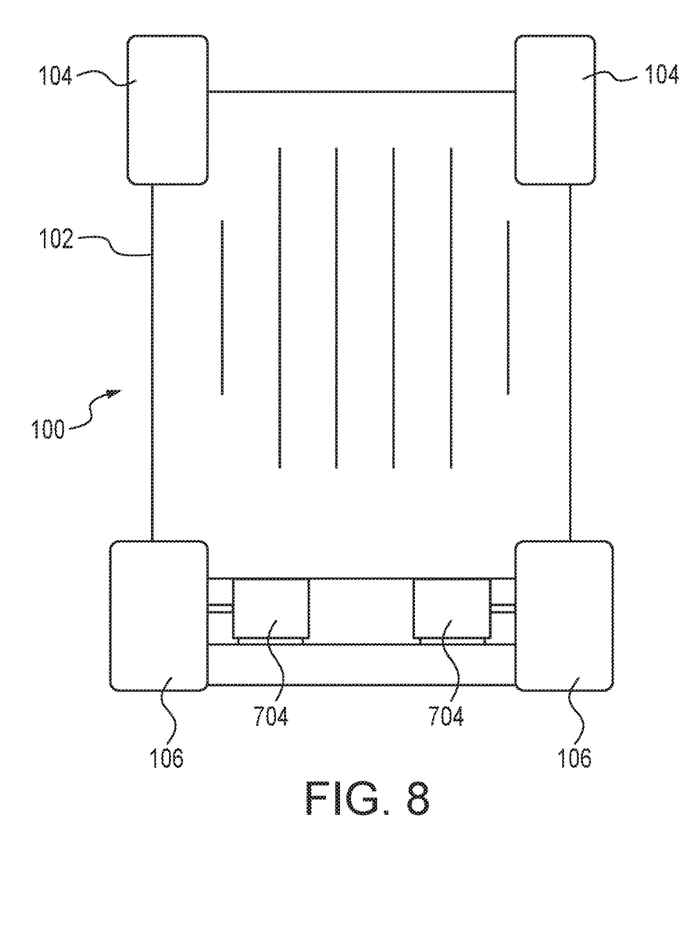
FIG. 8 is a bottom view of the exemplary generator pulley system having a different maneuvering mechanism in accordance with one aspect of the present disclosure.

FIG. 8 is a bottom view of the exemplary generator pulley system 100 having a different maneuvering mechanism in accordance with one aspect of the present disclosure. At least two motors 704 may rotate the front wheels 106 while the rear wheels 104 rotate freely. The motors 704 may be powered through the battery, generator 102, or combination thereof. The two motors 704 may spin different front wheels 106 at varying speeds. Through this, the generator pulley system 100 may rotate at multiple angles depending on how they rotate between each other.

Figure 9:
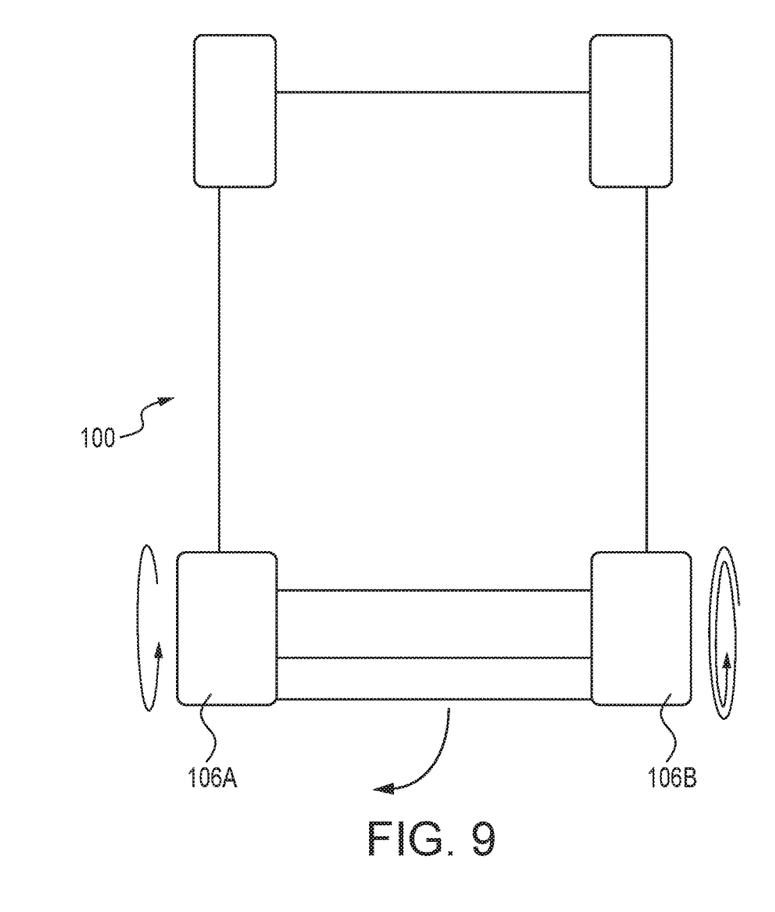
FIG. 9 is a bottom view of the exemplary generator pulley system showing a left turn in accordance with one aspect of the present disclosure.

FIG. 9 is a bottom view of the exemplary generator pulley system 100 showing a left turn in accordance with one aspect of the present disclosure. When turning left, a right wheel 106B may spin or rotate faster than a left wheel 106A. Depending on the coordination and interaction between the two front wheels 106, various turning angles may be enabled. When going straight, the left wheel 106A and right wheel 106B turn at the same speed.

Figure 10:
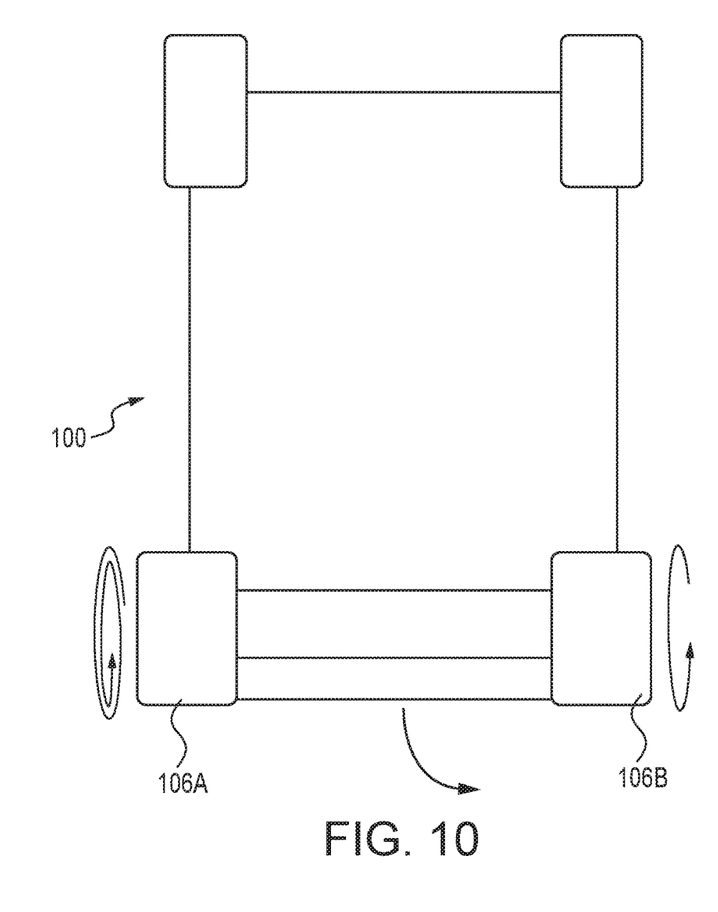
FIG. 10 is a bottom view of the exemplary generator pulley system showing a right turn in accordance with one aspect of the present disclosure.

FIG. 10 is a bottom view of the exemplary generator pulley system 100 showing a right turn in accordance with one aspect of the present disclosure. For a right turn, the left wheel 106A may spin or rotate faster than the right wheel 106B. Again, various angles may be provided depending on how fast each wheel 106 is turning with respect to one another. While the front wheels 106 were shown as rotating, the rear wheels may be used to move the system 100.

Figure 11:
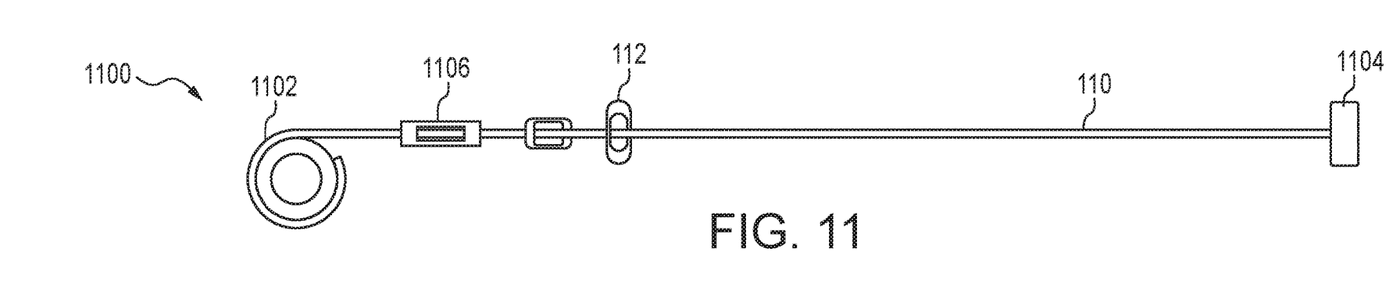
FIG. 11 is a side view of an exemplary pulley system of the power generator in accordance with one aspect of the present disclosure.

Now referring to FIG. 11, a side view of an exemplary pulley system 1100 in accordance with one aspect of the present disclosure is provided. The pulley system 1100 may be a part of the generator pulley system. The pull line 110, for which the majority of discussion below will detail, may go through the inlet 112. A retracting mechanism 1102 may allow the pull line 110 to be extracted and retracted. The retracting mechanism 1102 may be made of a coil and spring combination, for example, which may cause pull line 110 to self-wind.

The retracting mechanism 1102 may swivel or change directions internal to the generator pulley system. In one embodiment, the mechanism 1102 may be affixed and non-moving. Through the pull line 110 and the pulley system 1100, the generator pulley system 100 may be directed to traverse in horizontal and vertical movements.

A sensor may be provided within the retracting mechanism 1102. This sensor may measure the amount of pull from the pull line 110. Depending on this pull, the motors in the generator pulley system may vary the speed. For example, the strong or harder the pull on the pull line 110, the faster the front wheels may rotate. The speed may reach up to a certain threshold, for example, three (3) to six (6) miles per hour.

In one embodiment, the pull line 110 may be retracted to the inlet 112 such that the pull line 110 does not interfere with its surrounding area. The line 110 may also be left extended outside of the inlet 112 with a predetermined length outside the generator pulley system.

A handle 1104 on one end of the pull line 110 may be provided for better gripping. The handle 1104 on the line 110 may come in many forms and change in shape depending on how much grip is needed by the user.

The generator pulley system may include a lock or brake. If the pull line 110 is placed into its original position, through the retracting mechanism 1102, the wheels may be automatically locked. The front wheels, rear wheels, or combination thereof may be locked. Typically, the wheels may be locked if there is no tension in the pull line 110 as sensed by the retracting mechanism 1102. A default state may be to lock the wheels into place.

A first sensor 1106 may be used to determine the up and down trajectory of the pull line 110. As shown, the pull line 110 may be within a center of the first sensor 1106. When light or no touches are detected by the first sensor 1106, no horizontal pulling is detected. That is, the user may not be going uphill or downhill. Through this information, the sensor may keep power flow as normal on the wheels. No uphill or downhill scenario power is used.

Figure 12:
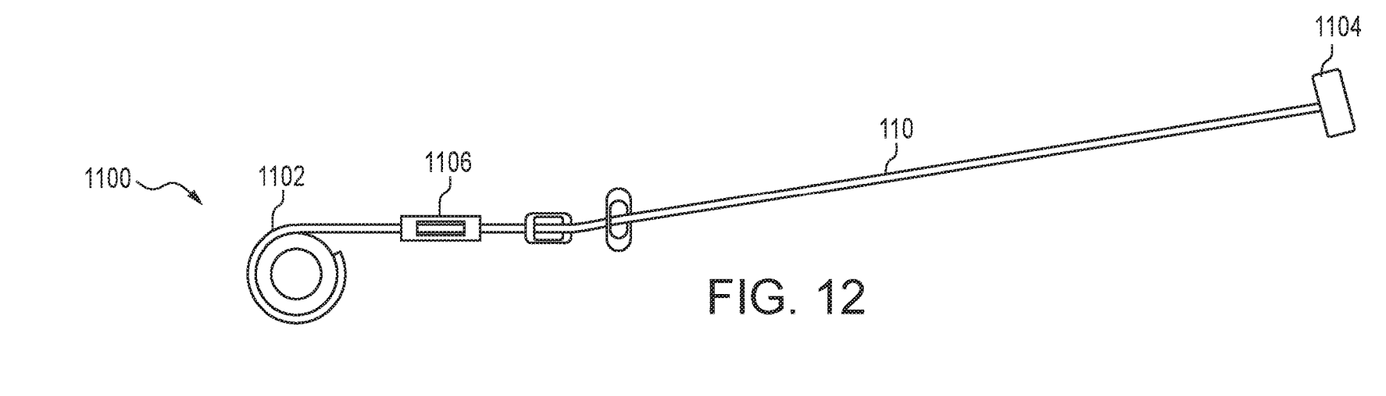
FIG. 12 is a side view of the exemplary pulley system angled upwards in accordance with one aspect of the present disclosure.

FIG. 12 is a side view of the exemplary pulley system 1100 angled upwards in accordance with one aspect of the present disclosure. The retracting mechanism 1102 may hold the pull line 110 on one end as the handle 1104 is pulled upwards. The sensor 1106 may detect a touch at its top portion as shown. In one embodiment, and depending on the placement where the pull line 110 is connected to the generator pulley system, a slight upward touch on the sensor 1106 would not indicate that the user is going uphill. If, however, there is a significant touch or activation of the sensor 1106 the user may be dragging the generator pulley system up a hill or slope.

In operation, and by detecting the upward pull, additional power may be provided to the front wheels of the generator pulley system. The at least one motor may be given additional power when going up the hill or slope. The brakes may be released after a certain pull threshold is met on the pull line 110.

Figure 13:
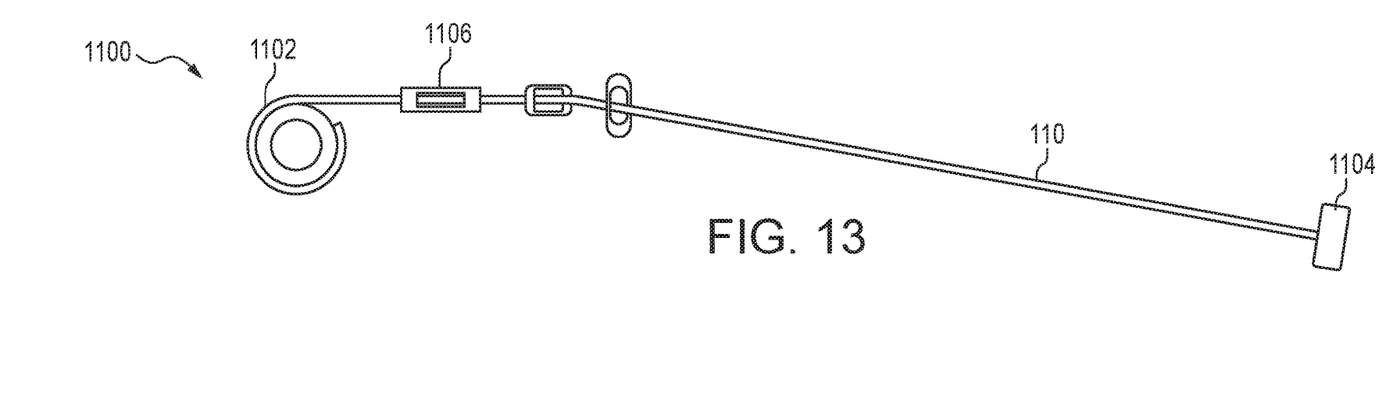
FIG. 13 is a side view the exemplary pulley system angled downwards in accordance with one aspect of the present disclosure.

FIG. 13 is a side view the exemplary pulley system 1100 angled downwards in accordance with one aspect of the present disclosure. The retracting mechanism 1102 may hold the pull line 110 into place while the line 110 is pulled downwards through the handle 1104. The sensor 1106 may detect this pressure on its bottom. In one embodiment, and depending on the tension within the retracting mechanism 1102, a slight touch on the sensor 1106 may indicate that the user is not pulling the generator pulley system. Rather, it may indicate that the user has rested the pull line and gravity has caused the sensor 1106 to read the pull line 110. Thus, no movement should occur. This may be a function of the retracting mechanism 1102 and the sensor 1106. When there is a significant touch, however, the user may be dragging the generator pulley system 100 downhill.

In operation, and by detecting the downward pull, less power may be provided to the front wheels of the generator pulley system. The at least one motor may be given less power when going downhill. The brakes may be released before the motor begins its work. A threshold tension on the pull line 110 may be used to actuate the motors for movement of the generator pulley system. Additional braking may be applied when going downhill.

Figure 14:
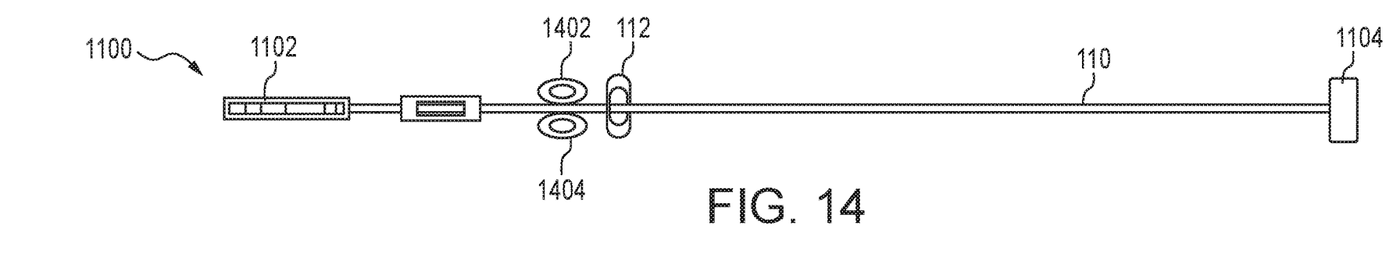
FIG. 14 is a top view of the exemplary pulley system in accordance with one aspect of the present disclosure.

Vertical movements, including upward and downwards, of the pull line 110 were described above. Horizontal movements may also be provided by the user. Typically, the sharper the turn on the pull line 110, the greater the change on the axle or difference in rotational speeds of the front wheels. Turning to FIG. 14, a top view of the exemplary pulley system 1100 in accordance with one aspect of the present disclosure is provided. At least two sensors 1402 and 1404 may detect pulls from the pull line 110 and the handle 1104. The left sensor 1402 may detect when the pull line 110 is angled towards the left and the right sensor 1404 may detect movements on the right. As shown, there has been no detection by the right sensor 1402 or left sensor 1402. When pulled, and no detection is made, power may be provided to the front wheels equally. The inlet 112 may protect the right sensor 1402 and left sensor 1402.

Figure 15:
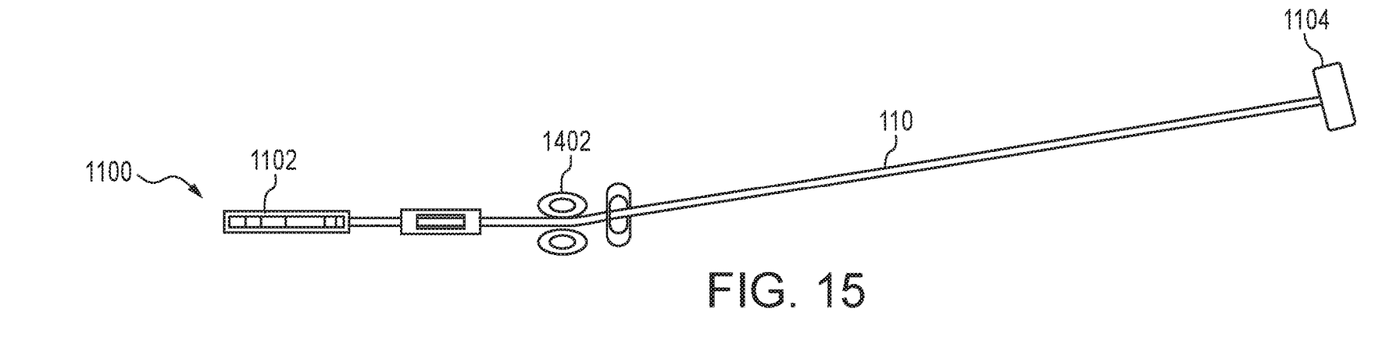
FIG. 15 is a top view of the exemplary pulley system angled leftwards in accordance with one aspect of the present disclosure.

FIG. 15 is a top view of the exemplary illustrative pulley system 1100 angled leftwards in accordance with one aspect of the present disclosure. When the pull line 110 comes in contact with the left sensor 1402 through a leftward pull using the handle 1104, a left command may be determined. This may cause the left front wheel to rotate slower than the right wheel. A larger angle may be detected by the left sensor 1402 which may cause the left front wheel to rotate even slower than the right front wheel. Alternatively, the front wheels themselves may be rotated to the left.

Figure 16:
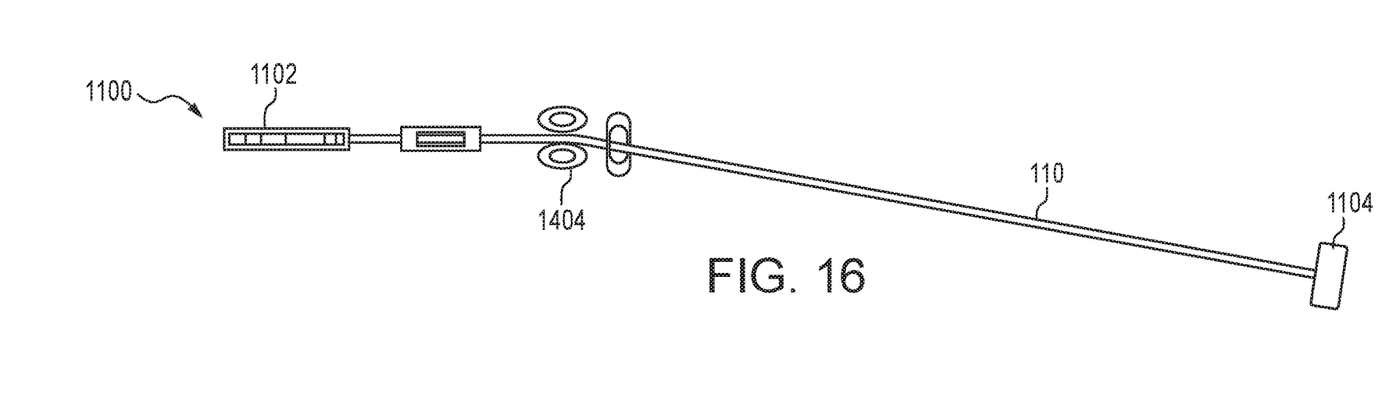
FIG. 16 is a top view of the exemplary pulley system angled rightwards in accordance with one aspect of the present disclosure.

FIG. 16 is a top view of the exemplary illustrative pulley system 1100 angled rightwards in accordance with one aspect of the present disclosure. When the pull line 110 comes in contact with the right sensor 1404 through a rightward pull using the handle 1104, a right command may be determined. This may cause the right front wheel to rotate slower than the left wheel. A larger angle may be detected by the right sensor 1402 which may cause the right front wheel to rotate even slower than the left front wheel. Alternatively, the front wheels themselves may be rotated to the right.

Figure 17:
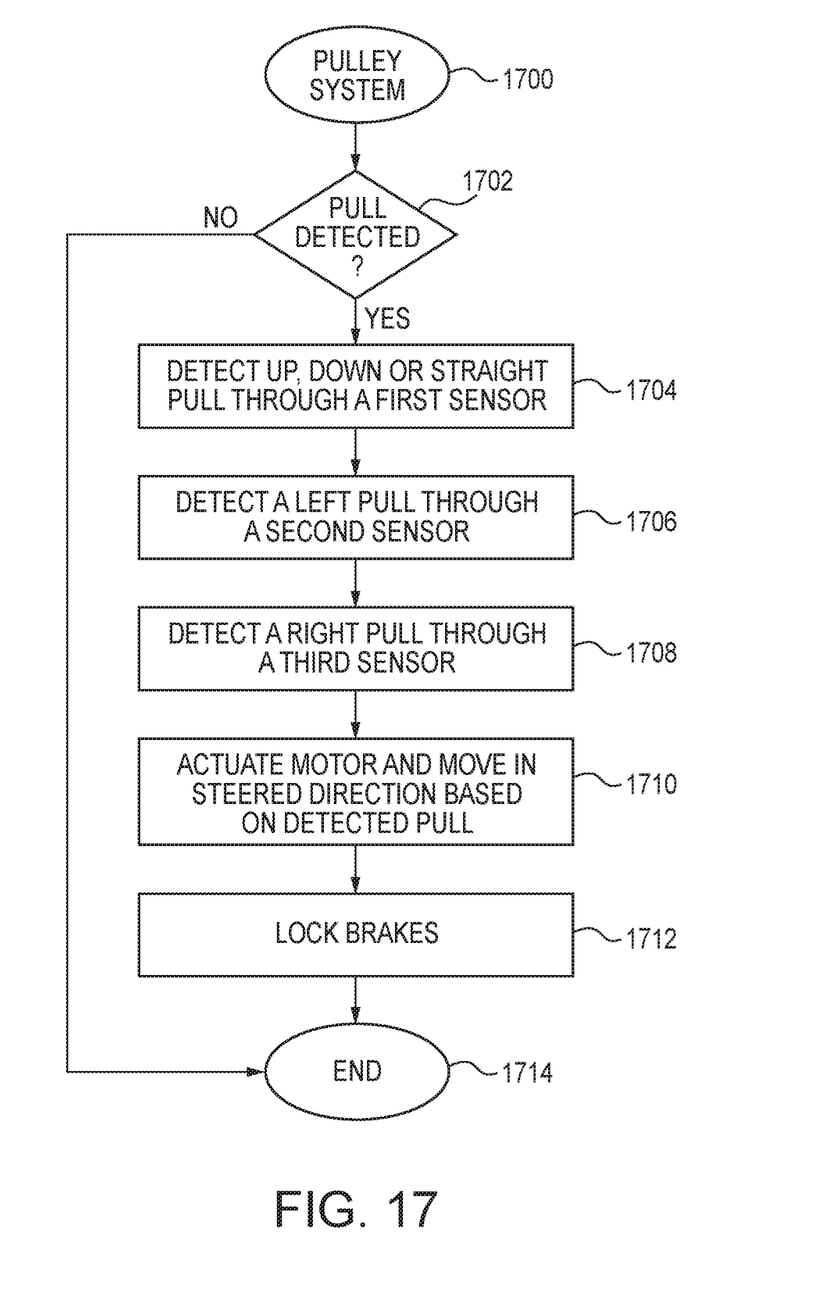
FIG. 17 is an illustrative flow chart showing exemplary processes for maneuvering the generator pulley system in accordance with one aspect of the present disclosure.

FIG. 17 is an illustrative flow chart showing exemplary processes for maneuvering the generator pulley system in accordance with one aspect of the present disclosure. Fewer or more processes may be used. The pulley system along with the three sensors described above is an illustration and should not be construed as limiting. The processes may begin at block 1700.

At decision block 1702, a determination may be made on whether a sensor detects a pull on the pull line. The sensor may be located on the retracting mechanism. When no pull is detected, the brakes may be locked at block 1712. This may prevent the generator pulley system from moving. The processes may end at block 1714.

If a pull on the pull line has been detected, a first sensor may be used for detecting whether the pull line is pulled up, down or straight at bock 1704. Vertical movements may be detected. An upward pull may indicate that additional power may be used to pull the generator pulley system uphill. If downhill, less power may be applied and additional braking options may be provided.

At block 1706, the pulley system may detect a leftward pull through a second sensor. The axle for the front wheels may be rotated to turn left when such a detection is made. Alternatively, the front wheels may be spun at different speeds for making a left turn. At block 1708, a rightward pull may be detected through a third sensor. This may detect that the user may be pulling the generator pulley system towards the right. The axle may be rotated to turn right. Alternatively, the left front wheel may be rotated quicker than the right front wheel.

At block 1710, at least one motor is actuated for moving the generator pulley system. The axle may be rotated or wheel speeds may be differentiated to make turns based on the previous detections. Based on the amount of pull, as detected by the retracting mechanism, the speed of the motors may be adjusted. The speed may also be dependent on whether the system is being pulled uphill or downhill. At block 1712, the brakes may be locked when no further pull is detected. The processes may end at block 1714.

Figure 18:
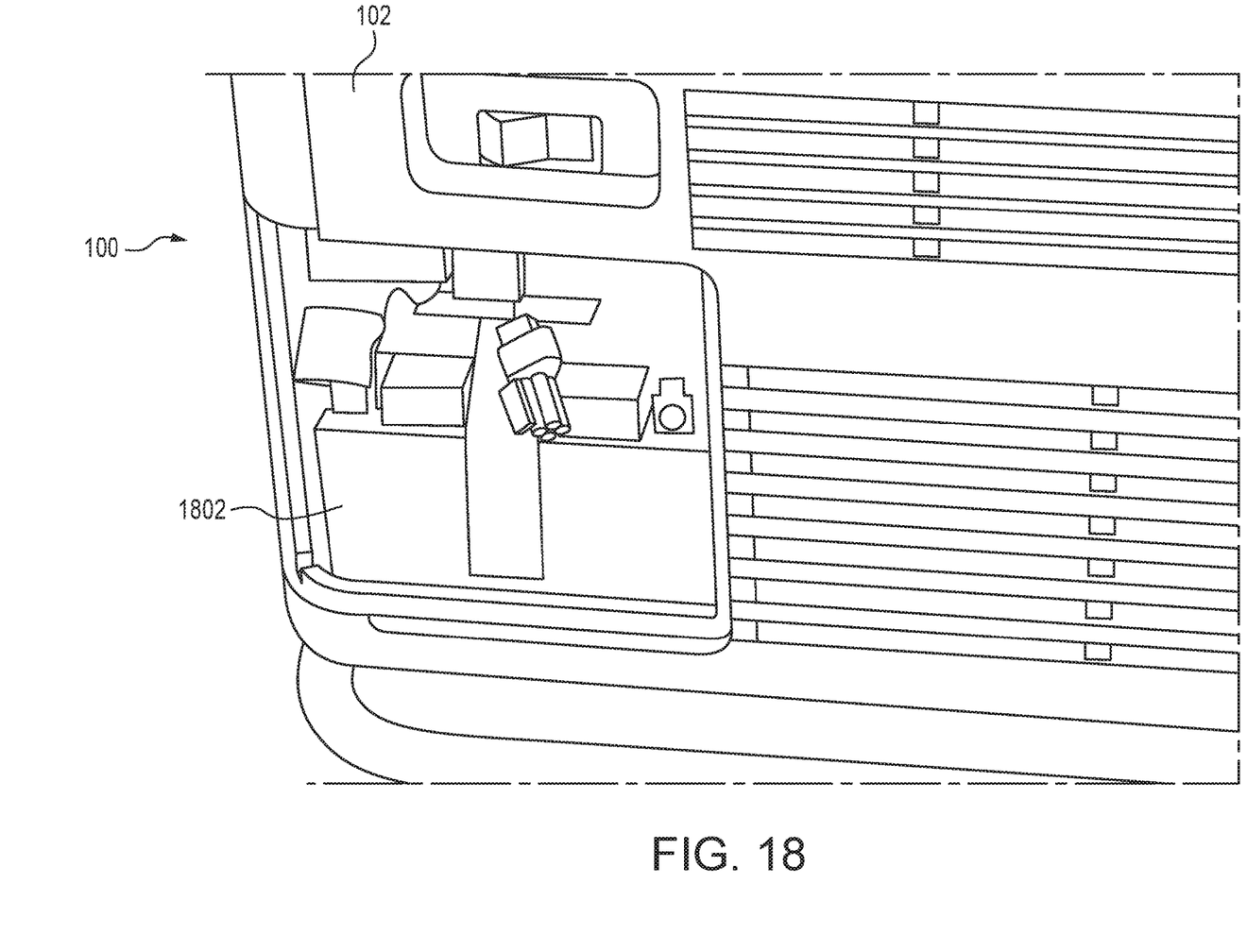
FIG. 18 is a front view of the exemplary illustrative generator pulley system exposing a battery system in accordance with one aspect of the present disclosure.

With reference now to FIG. 18, a front view of the exemplary generator pulley system 100 exposing a battery system 1802 in accordance with one aspect of the present disclosure is provided. The battery system 1802 may be accessed through a panel on the generator 102. The battery system 1802 may be powered through the generator 102. The battery system 1802 may power the at least one motor to provide movement for the generator pulley system 100.

The battery system 1802 may be made of different combinations of chemicals. Rechargeable battery systems 1802 may be made of lead-acid, nickel-cadmium (NiCd), nickel-metal hydride (NiMH), lithium-ion (Li-ion), lithium-ion polymer (LiPo), and rechargeable alkaline batteries, for example.

Typically, the battery system 1802 may be recharged when the generator 102 is running. The battery system 1802 may be recharged based on its SOC. After going below a predetermined SOC, the generator 102 may automatically run to increase the charge within the battery system 1802.

The battery system 1802 may be recharged after a period of time. Typically, the generator pulley system 100 may be stored indoors. To prevent any unwanted indoor fumes, the battery system 1802 may not be recharged until a period of time lapses. During this time, the user may move the system 100 outdoors for proper ventilation. In one example, this may be five (5) minutes. If the SOC of the battery system 1802 is too low to move the generator pulley system 100, a warning may be displayed or sound may be made to indicate that the generator 102 is about to run to charge the battery system 1802.

Figure 19:
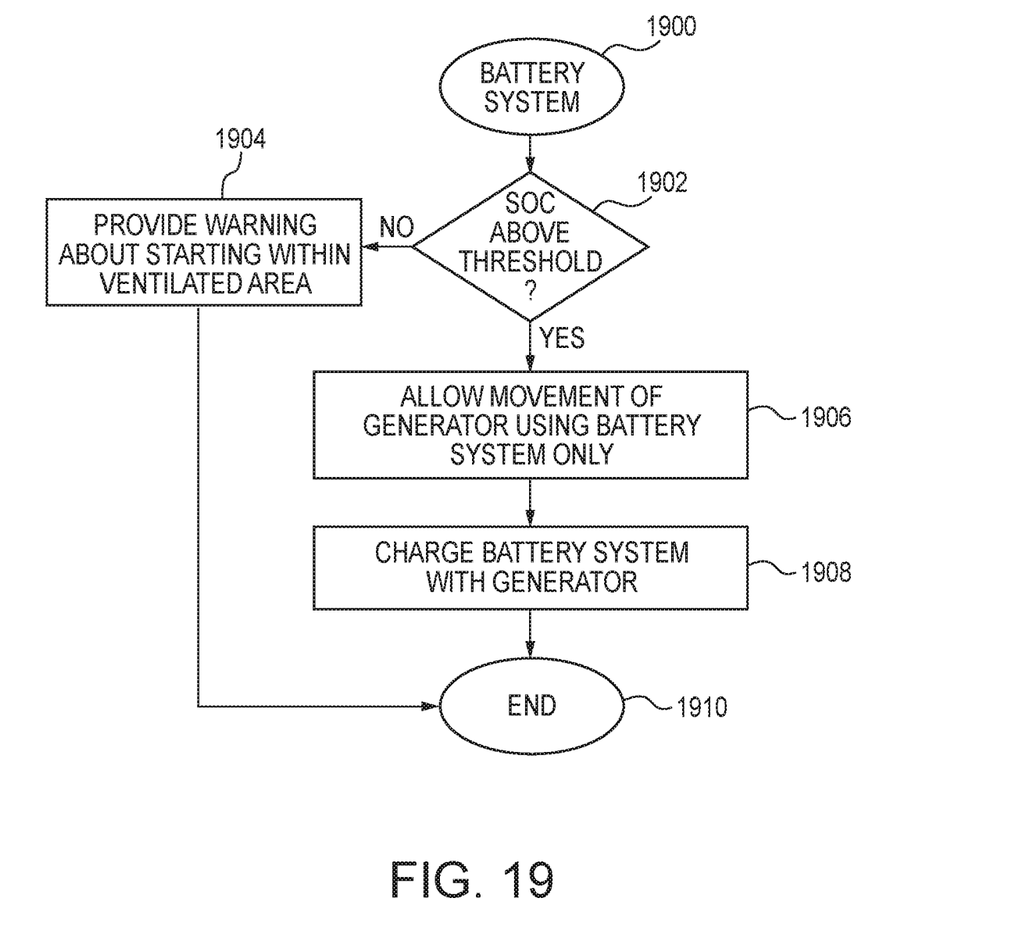
FIG. 19 is an illustrative flow chart showing exemplary processes for charging the battery system within the generator pulley system in accordance with one aspect of the present disclosure.

FIG. 19 is an illustrative flow chart showing exemplary processes for charging the battery system within the generator pulley system in accordance with one aspect of the present disclosure. The battery system described above is just one embodiment and should not be construed as limiting. The processes may begin at block 1900.

At decision block 1902, a determination is made on whether the SOC of the battery system is above a threshold. This check is made to determine whether there is enough power to bring the generator pulley system out of an enclosed space such that no fumes are placed into a confined space. If the battery system does not have enough SOC, at block 1904, a warning is provided about the generator not having enough power to roll itself out. The warning may be provided as audio or in a preferred visual display. The battery system may be charged at block 1908 through the generator and the processes may end at block 1910.

If the SOC is above the threshold, at block 1906, the generator pulley system may allow movement using the battery system only. The battery system may be charged at block 1908. The battery system may be charged when in a safe area to do so, and this may be determined by a predetermined time period. The processes may end at block 1910.

The methods and processes described in the disclosure may be embodied as code and/or data, which may be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described may be included in hardware modules. For example, the hardware modules may include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein may be implemented as logical operations and/or modules. The logical operations may be implemented as a sequence of processor-implemented executed steps and as interconnected machine or circuit modules. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations may be performed in any order, unless explicitly claimed otherwise or a specific order is inherently necessitated by the claim language.

Various embodiments of the present disclosure may be programmed using an object-oriented programming language, such as SmallTalk, Java, C++, Ada or C #. Other object-oriented programming languages may also be used. Alternatively, functional, scripting, and/or logical programming languages may be used. Various aspects of this disclosure may be implemented in a non-programmed environment, for example, documents created in HTML, XML, or other format that, when viewed in a window of a browser program, render aspects of a GUI or perform other functions. Various aspects of the disclosure may be implemented as programmed or non-programmed elements, or any combination thereof.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A generator pulley system comprising:
a line;
at least one sensor;

at least one motor;
a memory for storing computer readable code; and
a processor operatively coupled to the memory, the processor configured to:
 monitor the line with the at least one sensor;
 actuate the at least one motor when the line is pulled to move the system in a direction of the pulled line.

2. The generator pulley system of claim 1, comprising at least three sensors for detecting horizontal and vertical movements within the line.

3. The generator pulley system of claim 1, comprising a battery for powering the at least one motor.

4. The generator pulley system of claim 3, wherein the battery is charged through a generator on the generator pulley system.

5. The generator pulley system of claim 1, wherein moving the system comprises adjusting a set of wheels in the direction of the pulled line.

6. The generator pulley system of claim 1, wherein moving the system comprises rotating one wheel quicker than another wheel in the direction of the pulled line.

7. The generator pulley system of claim 6, comprising multiple motors providing different rotational speeds.

8. A generator comprising:
a line;
at least one sensor monitoring the line; and
at least one motor for moving the generator in a direction sensed by the at least one sensor monitoring the line when pulled.

9. The generator of claim 8, wherein the line is retractable.

10. The generator of claim 8, wherein an amount of pull on the line corresponds to a speed of the at least one motor.

11. The generator of claim 10, wherein the line is extended to a maximum amount causing the at least one motor to produce its highest speed.

12. The generator of claim 10, wherein the at least one motor is stopped if no pull is sensed by the at least one sensor.

13. The generator of claim 8, comprising at least three sensors for detecting horizontal and vertical movements within the line.

14. The generator of claim 8, comprising a battery rechargeable by the generator, wherein the battery powers the at least one motor.

15. The generator of claim 14, wherein the battery is recharged after a state of charge of the battery drops below a predetermined threshold.

16. The generator of claim 15, wherein the battery is prevented from charging until a period of time is reached.

17. A non-transitory machine-readable storage medium comprising instructions, which when implemented by one or more machines, cause the one or more machines to perform operations comprising:
 detecting a direction of a pulled line on a generator by at least one sensor; and
 actuating at least one motor for moving the generator in the direction detected by the at least one sensor.

18. The non-transitory machine-readable storage medium of claim 17, wherein the direction comprises horizontal and vertical movements.

19. The non-transitory machine-readable storage medium of claim 17, wherein the at least one motor is stopped when no pull is detected.

20. The non-transitory machine-readable storage medium of claim 17, wherein the operations comprise recharging a battery through the generator for actuating the at least one motor.

* * * * *